No. 799,989. PATENTED SEPT. 19, 1905.
C. J. KLEIN.
OUTLET BOX.
APPLICATION FILED SEPT. 23, 1904.
2 SHEETS—SHEET 1.
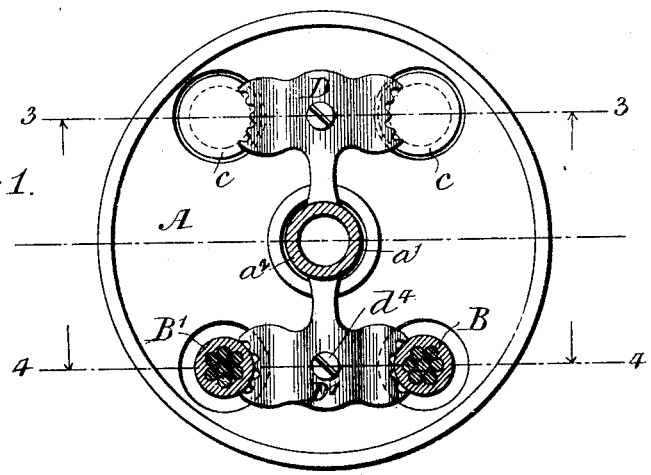
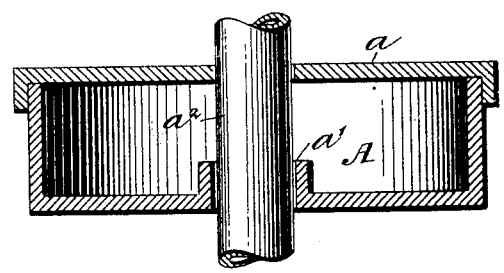
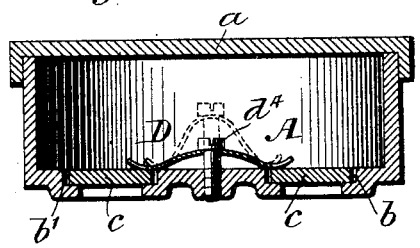
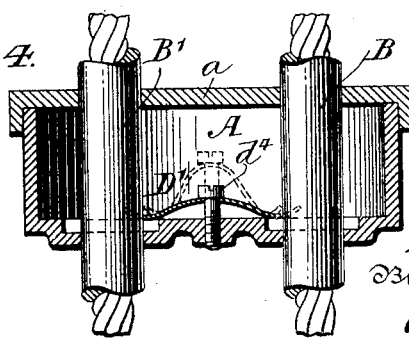
Witnesses:
Philip Mindil
Victor Mangine
Inventor:
Charles J. Klein,
By Raymond ......
his Attorney.

No. 799,989. PATENTED SEPT. 19, 1905.
C. J. KLEIN.
OUTLET BOX.
APPLICATION FILED SEPT. 23, 1904.
2 SHEETS—SHEET 2.
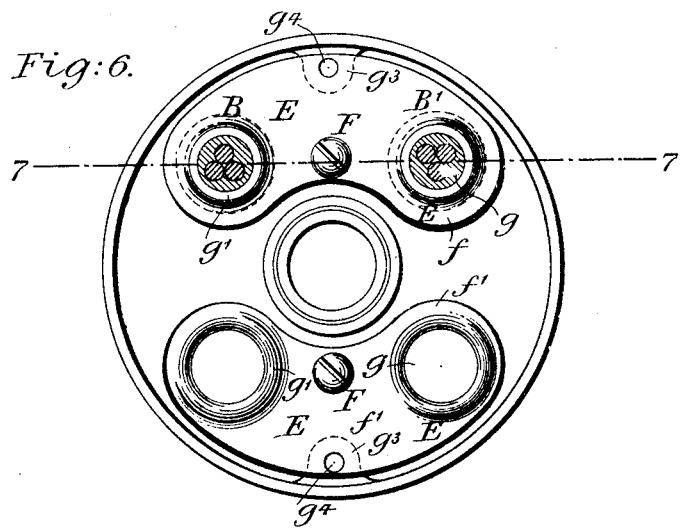
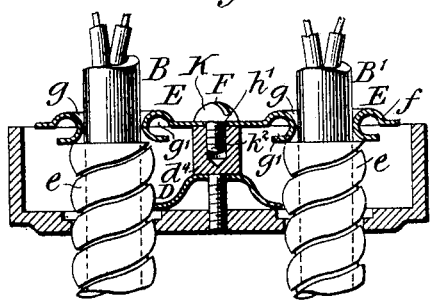
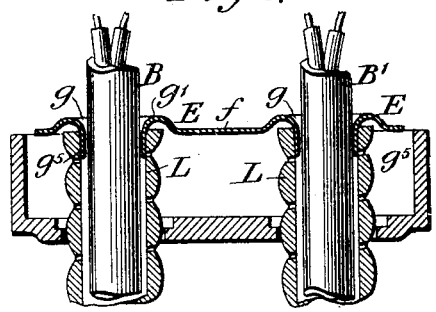

UNITED STATES PATENT OFFICE.

CHARLES J. KLEIN, OF NEW YORK, N. Y., ASSIGNOR TO RALPH A. SCHOENBERG, OF NEW YORK, N. Y.

OUTLET-BOX.

No. 799,989.  Specification of Letters Patent.  Patented Sept. 19, 1905.

Application filed September 23, 1904. Serial No. 225,574.

*To all whom it may concern:*

Be it known that I, CHARLES J. KLEIN, a citizen of the United States, residing in the borough of Manhattan, city, county, and State of New York, have invented certain new and useful Improvements in Outlet-Boxes, of which the following is a specification.

My invention relates to what are technically known in the electrical art as "outlet-boxes" or "junction-boxes"—that is, to a box or receptacle which provides for the ready making or changing of electric connections with outlet-conductors secured in the box or receptacle.

The invention has for its object to provide an improved outlet-box which will be superior in point of convenience in installation and use, positiveness in operation, inexpensiveness in construction, and general efficiency.

I will describe an outlet-box embodying my invention and then point out the novel features thereof in claims.

In the accompanying drawings, Figure 1 is a top plan view of an outlet-box embodying my invention, the cover therefor being removed. Fig. 2 is a central and vertical transverse sectional view with the cover in place. Fig. 3 is a vertical transverse sectional view taken on the line 3 3 of Fig. 1. Fig. 4 is a view similar to Fig. 3, but taken on the line 4 4, Fig. 1. Fig. 5 is a detail view. Fig. 6 is a view similar to Fig. 1 and showing a modified form of construction. Fig. 7 is a view similar to Fig. 4 and taken upon the line 7 7 of Fig. 6, and Fig. 8 is a view similar to Fig. 7 and showing a still further modified form of construction.

Similar letters of reference designate corresponding parts in all of the figures.

Referring now to the drawings, A designates a suitable box or receptacle which is preferably provided with a removable cover $a$. The box may be of any dimensions and contour. As shown in the drawings, it is cylindrical. The box is provided with a flanged or other opening $a'$, here shown as being centrally located, which receives a support $a^2$. The box is also provided or formed with one or more openings $b\ b'$, &c., through which outlet or other conductors or cables B B', &c., or the armor or conduits of or for the same may be passed. The openings are preferably formed with a shoulder which serves as a support for a disk $c$. A disk is provided for each opening through which a conductor B B' is not passed. These disks and the conductors are held in the box and the box secured to the support $A^2$ by preferably a common means, although, if desired, the box may be secured to its support by independent means. In the latter case, as will hereinafter appear, such independent means should have a metallic connection with the means for securing the disks and conductors in the box.

D D' designate common means for securing the conductors and disks in the box and the box to its support. These means preferably are such that when pressure is applied to them they will act to clamp or otherwise bind or hold the disks and conductors in the box. They are also independent of the box and may be removed therefrom. As here shown, they comprise bowed pieces of resilient metal and screws $d^4$, which when passed through a suitable opening in the box tend to flatten the metal, and thus cause its edge portions to move laterally. As shown in Fig. 5, each metal piece comprises three arms $d\ d'\ d^2$, two of which when the piece is in position in the box extend toward two adjacent conductor-openings in the box and the third toward the support. It will be understood that these pieces before being subjected to pressure by the screws $d^4$ are of such size as not to cover the conductor-openings; but when subjected to pressure they will extend over the openings, thus serving to hold a disk or disks or a conductor or conductors in place. The edge portions of two of the arms may be formed in any desired manner to firmly engage with the conductors to hold them in the box. The same is true of the third arm, which acts to hold the box to the support. It will be understood that the means D D', instead of being the common means described, may be provided with only two arms to coact with conductors or disks, and separate means may be employed to hold the box on the support, in which latter case said separate means should be electrically connected, respectively, with the means D D'. Preferably the support will be of metal—for example, a pipe which has some metallic connection with the ground. The advantage of this is that should there be any defect in the insulation of the conductor or conductors within the box the securing means D D' will serve as a path directly to the ground. This should be true whether the means D D' act to secure the conductors and disks in the box and the box to the support or only the conductors and disks in the box.

The means D D' do not destroy the insulation of the conductors when subjected to pressure, but only act to clamp, bind, or hold the conductors in the openings. As regards the disks, the means D D' when subjected to pressure extend over the disks (see Fig. 3) to hold them on the shoulders.

It will be understood that the disks $c$ when retained in the openings $b$ $b'$ by the means D D' serve to close said openings and maintain a closed condition of the outlet-box.

In the modified form of construction illustrated in Figs. 6 and 7, a bushing device E is provided for the end portion of the armor $e$ of each conductor B and B', such bushing device E surrounding the conductor where it projects within the outlet-box beyond the armor $e$ and preventing the contact of the end of the armor with the conductor. Were such contact permitted, the insulation of the conductor would be subjected to chafing and cutting, tending to pierce the insulation and short-circuit the conductor. In practice the bushing device E is held firmly in place by securing means F, and two of the bushing devices are comprised in a single rigid metallic plate of which two, $f$ and $f'$, are shown, such plates $f$ and $f'$ being formed at each end with an opening $g$, through which one of the conductors, such as B and B', passes, the plate fitting closely down upon the ends of the armor $e$ of the conductors at the marginal portions of the openings $g$ and effectually keeping the conductors out of contact with such ends of such armor. With this end in view the marginal portions of the openings $g$ are preferably crimped or curved, as at $g'$, to fit closely over the ends of the armor $e$. Each plate $f$ and $f'$ may be provided with an ear $g^3$, having a threaded opening $g^4$ to receive a screw for securing the cover of the outlet-box in position. The plates $f$ and $f'$ are arranged above the securing means D D', and the securing means F consist of screws $k$, which pass through openings $h'$ in the plates $f$ $f'$ and hold the latter firmly in place, preferably entering tapped openings $k^2$ in the screws $d^4$, which hold the securing means D D' in place.

In the modified form of construction illustrated in Fig. 8 the conductors D D' are shown as entering the outlet-box within conduits L such as commonly are permanently installed in buildings and independent of the conductors themselves, the conductors being commonly drawn through the conduits, and thus lead to the desired points. In the use of such conduits a material space commonly surrounds the conductors within the same, and this permits of flanging the marginal portions of the openings $g$ of the plate $f$ or $f'$, constituting the two bushing devices E, as at $g^5$, such flanged marginal portions $g^5$ fitting over the end portions of the conduits L and within the latter between the conductors and the conduits, effectually keeping the conductors out of contact with the ends of the conduits with the same purposes as accomplished in connection with the conductors and armor construction disclosed in Figs. 6 and 7.

The plate $f$ or $f'$, or both, may be secured in position, as illustrated, in the same manner as described in connection with the illustration in Figs. 6 and 7.

I do not desire to be understood as limiting myself to the specific construction, arrangement, and connection of parts as illustrated and described, but reserve the right to vary the same in adapting my improvements to varying conditions of use without departing from the spirit of the invention or the terms of the following claims.

Having thus described my invention, what I claim as new is—

1. An outlet-box having common means for holding conductors therein and the box to a support.

2. An outlet-box having openings through which cables may be passed and disks fitted to close the openings and provided with common means for holding conductors in the box or disks in the openings.

3. An outlet-box having openings through which cables may be passed and disks fitted to close the openings, and provided with common means for holding conductors in the box or disks in the openings and the box to a support.

4. An outlet-box having common means for holding conductors therein and the box to a support, said means constituting an electrical path between the conductors and the support.

5. An outlet-box having resilient means for holding conductors therein, said means consisting of a bowed piece which is flattened into holding position.

6. An outlet-box having resilient means for holding conductors therein, said means consisting of a bowed piece, and means for subjecting said means to pressure to flatten said bowed piece into holding position.

7. An outlet-box having resilient common means for holding conductors therein and the box to a support, said means consisting of a bowed piece, and means for subjecting said means to pressure to flatten said bowed piece into holding position.

8. An outlet-box having means for holding conductors therein, said means consisting of a bowed piece, and means laterally actuating said holding means into operative position by flattening said bowed piece.

9. An outlet-box having means for holding armored conductors therein, a bushing device applied to the conductors at the end of the armor of each, and means for securing said bushing device in position.

10. An outlet-box having means for holding a conduit therein, a conductor within the conduit and projecting from the same within the outlet-box, and a bushing device applied to the conductor at the end of the conduit and extending between the conductor and the conduit.

11. An outlet-box having a conduit therein, a conductor within the conduit and projecting therefrom, and a bushing device applied to the conductor at the end of the conduit and extending between the conductor and the conduit.

12. An outlet-box having a plurality of conductors therein, and a plurality of bushing devices applied to said conductors within the outlet-box and comprising a plate provided with openings through which the conductors pass.

13. An outlet-box having a conduit therein, a conductor within the conduit and projecting from the end thereof, and a bushing device applied to the conductor at the end of the conduit and provided with a flange extending between the conductor and the conduit and over the end of the conduit.

14. An outlet-box having a plurality of conductors therein, and a plurality of bushing devices applied to said conductors within the outlet-box and comprising a plate provided with flanged openings through which the conductors pass.

In witness whereof I have signed my name to this specification in the presence of two subscribing witnesses.

CHARLES J. KLEIN.

Witnesses:
  A. B. FULTON,
  RAYMOND I. BLAKESLEE.